(12) United States Patent
Huoviala et al.

(10) Patent No.: US 8,385,242 B2
(45) Date of Patent: Feb. 26, 2013

(54) OPTIMISED MESSAGING PATTERNS

(75) Inventors: Rauno Huoviala, Helsinki (FI); Antti Pihlajamäki, Helsinki (FI)

(73) Assignee: Teliasonera AB, Stockholm (SE)

( * ) Notice: Subject to any disclaimer, the term of this patent is extended or adjusted under 35 U.S.C. 154(b) by 264 days.

(21) Appl. No.: 12/734,303

(22) PCT Filed: Oct. 13, 2008

(86) PCT No.: PCT/FI2008/050570
§ 371 (c)(1),
(2), (4) Date: Jun. 24, 2010

(87) PCT Pub. No.: WO2009/053522
PCT Pub. Date: Apr. 30, 2009

(65) Prior Publication Data
US 2010/0260148 A1    Oct. 14, 2010

(30) Foreign Application Priority Data
Oct. 23, 2007   (FI) .................................. 20075747

(51) Int. Cl.
*G08C 17/00*   (2006.01)
*H04W 4/00*   (2009.01)
*H04B 7/212*   (2006.01)
*H04J 3/16*   (2006.01)
*H04J 3/02*   (2006.01)

(52) U.S. Cl. ........ 370/311; 370/329; 370/341; 370/348; 370/437; 370/443; 370/462

(58) Field of Classification Search .................. 370/311, 370/328, 329, 341, 347, 348, 443, 462
See application file for complete search history.

(56) References Cited

U.S. PATENT DOCUMENTS

| 5,491,837 A | * | 2/1996 | Haartsen .................. 455/62 |
| 2002/0173327 A1 | | 11/2002 | Rosen et al. |

FOREIGN PATENT DOCUMENTS

| EP | 1 414 256 A1 | 4/2004 |
| EP | 1 708 534 A1 | 10/2006 |
| EP | 1 773 005 A1 | 4/2007 |
| EP | 1 890 503 A1 | 2/2008 |
| GB | 2 369 003 A | 5/2002 |
| JP | 9135201 | 5/1997 |
| WO | WO 01/31950 A1 | 5/2001 |
| WO | WO 2005/072494 A2 | 8/2005 |
| WO | WO2007030742 | * 3/2007 |

* cited by examiner

*Primary Examiner* — Ronald Abelson
(74) *Attorney, Agent, or Firm* — Cozen O'Connor (57) ABSTRACT

A fixed phase shift for each of a plurality of radio frequency signal components directed to or received from a plurality of antenna elements (100A, 100B) is formed in a phase shifter (102). A desired antenna beam pattern with at least one grating lobe is formed on the basis of the phase-shifted radio frequency signal components of the antenna elements (100A, 100B) in a predefined antenna structure.

17 Claims, 3 Drawing Sheets

OPTIMISED MESSAGING PATTERNS

PRIORITY CLAIM

This is the U.S. national stage of application No. PCT/FI2008/050570, filed on 13 Oct. 2008. Priority is claimed from Finland Patent Application No. 20075747, filed 23 Oct. 2007, the entire content of which is expressly incorporated herein by reference.

FIELD OF THE INVENTION

The present invention relates to power saving in communication terminals, and more particularly to optimised messaging patterns.

BACKGROUND OF THE INVENTION

With the popularity of services like presence/IM, IMS services, push mail, push-to-talk services etc., the need for "always on" services is becoming important for service providers in telecommunication networks. For instance, the presence service may be regarded as a client-server-based home environment service, wherein the home environment (presence server) manages the presence information of users' devices (clients), services and service media, even when roaming. The presence information is a set of attributes characterizing current properties of presence information of a user's device, and it may be delivered to other user devices within the communication group. There are also plans to implement the presence feature in mobile VoIP (Voice over IP) applications, whereby it could be easily detected whether a user device can be contacted via a VoIP connection.

Instant Messaging (IM), especially in mobile environment, is a presence enabled real-time messaging service, which allows faster and quicker messaging e.g. compared to SMS text messages. Some IM applications also allow group communication. Push e-mail, in turn, is an "always-on" service, wherein new e-mail is instantly and actively transferred ("pushed") to the e-mail client, when the e-mail arrives at the mail server.

What is common to these and many other "always-on" services is that they occasionally, but still constantly, send and receive small application-related messages. The messages are e.g. state updates, update request, keep-alive messages, or small user data messages. Typically, each service application has its own message pattern, i.e. a message transmission schedule, and the message patterns of different applications may vary significantly from each other.

However, in terms of radio resource optimisation and especially power usage in WCDMA access network, such promiscuity in message transmission is problematic. Transmission of each message requires its own radio channel activation causing extra power consumption. Furthermore, when the size of the message exceeds a threshold value, the message is always transmitted on the dedicated transport channel (DCH) of the WCDMA network, which is very power demanding compared to the rather small size of a typical message. Thus, there exists a need for a more optimised message pattern for "always-on" applications.

SUMMARY OF THE INVENTION

Now there has been invented an improved method and technical equipment implementing the method, by which the current consumption of the terminal can be reduced significantly. Various aspects of the invention include a method, a communication terminal and a computer program, which are characterized by what is stated in the independent claims. Various embodiments of the invention are disclosed in the dependent claims.

According to a first aspect, a method according to the invention is based on the idea of reducing current consumption in a communication terminal, which terminal comprises one or more always-on applications arranged to send and receive messages relating to said one or more always-on applications to and from one or more always-on application servers connected to a communication network, the sending and receiving being carried out according to a messaging pattern specific to each always-on application. In the method, information is gathered on the messaging pattern of at least one always-on application, on one hand, on parameters of communication channels allocated for said sending and receiving of said messages, on the other hand. Then a uniform messaging pattern is determined for said messages according to the following rule: arranging one or more messages to be transmitted together such that the most energy efficient communication channel is used, or if the size of a message exceeds the transmission capacity of the most energy efficient communication channel, arranging said message to be transmitted on a next most energy efficient communication channel having a transmission capacity for transmitting said message.

According to an embodiment, an allowable transmission delay is determined for said messages, and messages from said one or more always-on applications during said allowable transmission delay are combined into a group of messages.

According to an embodiment, a message package including the number of messages transmittable within the transmission capacity of the most energy efficient communication channel is determined from said group of messages, and a transmission interval is determined for the message packages such that all messages within said group of messages are transmitted during said allowable transmission delay.

According to an embodiment, said uniform messaging pattern for the messages of said one or more always-on applications is determined separately for uplink direction and downlink direction.

According to an embodiment, said uniform messaging pattern for downlink direction is transmitted to said one or more always-on application servers, and the downlink messaging is arranged by means of said one or more always-on application servers and a channel resource function of the communication network.

According to an embodiment, the uplink messaging is controlled according to said uniform messaging pattern by means of a channel resource function of the terminal.

According to an embodiment, the communication network includes a WCDMA access network, wherein the communication channels allocated for transmitting said messages between said terminal and the communication network are determined by RRC states, which are controlled by the radio resource management (RRM) blocks of said terminal and said network.

According to an embodiment, the messages to be transmitted are arranged according to energy efficiency and transmission capacity of DCH, FACH and PCH states of the WCDMA access network.

The arrangement according to the invention provides significant advantages. The first and the foremost advantage is that remarkable savings in current consumption can be achieved, thereby extending the battery lifetime of the terminal. The savings can be achieved regardless of the used always-on applications and their parameters. Furthermore, from the network viewpoint, the current savings are even more significant than for the terminal, since the number of messages transmitted in the network easily grows exponentially, when the always-on applications become more popular.

A second aspect and a third aspect provide a communication terminal and a computer program, which are arranged to implement the above method.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which.

DESCRIPTION OF EMBODIMENTS

In the following, the invention will be illustrated by referring to WCDMA access scheme used in 3GPP UMTS system. It is, however, notified that the invention is not limited to UMTS solely, but it can be implemented in any communication system, wherein always-on applications or similar applications requiring continuous transmission of small application-related messages. For example, the invention may be utilized in GSM or WLAN terminals including always-on applications.

Figure 1:
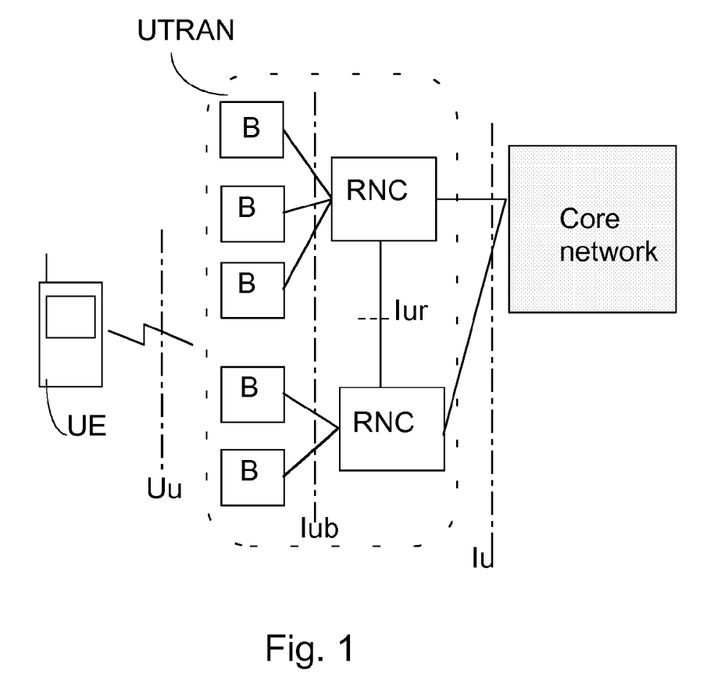
FIG. 1 shows the system architecture of the UMTS terrestrial radio access network (UTRAN)

UMTS (Universal Mobile Telecommunications System) is the $3^{rd}$ generation mobile communication system, wherein the wireless cellular access network is implemented using WCDMA. In the system architecture of the UMTS terrestrial radio access network (UTRAN) shown in FIG. 1, a radio network controller (RNC) is connected to a core network via an Iu interface, the RNCs are interconnected via an Iur interface, and one RNC is connected to one or more Node Bs via an Iub interface. A Node B contains one or more cells, the cell being a basic unit to which user equipment (UE) has wireless access via a radio interface Uu.

Figure 2:
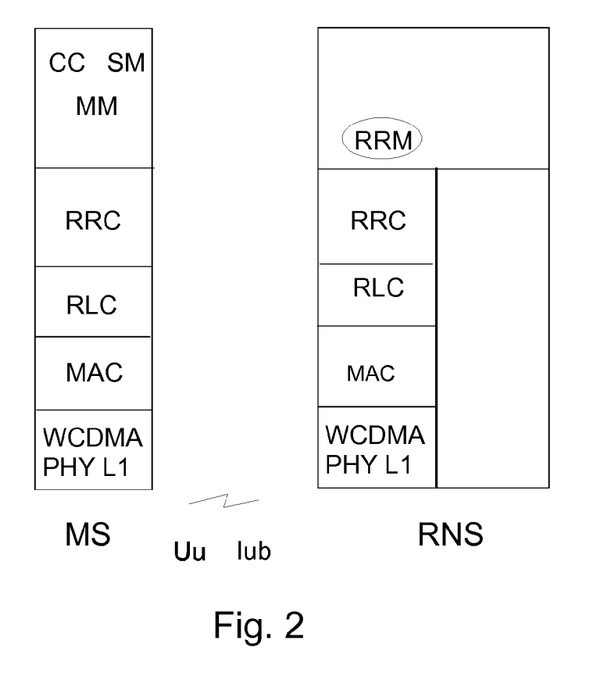
FIG. 2 shows the UMTS radio interface protocol architecture from the control plane perspective.

Considering the UMTS radio interface protocol architecture from the control plane perspective, as shown in FIG. 2, the bottom layer is a physical (WCDMA PHY L1) layer, above the physical layer are a media access control (MAC) layer, a radio link control (RLC) layer and a radio resource control (RRC) layer. The RRC layer offers services to higher layers of non-access stratum, i.e. to mobility management (MM), call control (CC), session management (SM) etc., the signalling of which is encapsulated into RRC messages for transmission over the radio interface. The RRC layer uses the lower layer protocols, in turn, to configure the parameters for the physical, transport and logical channels, and to command the lower layer protocols to perform various measurements.

From the RRC layer point of view, the user equipment UE operates either in a connected mode or in an idle mode. The connected mode is further divided into service states, which define what kind of physical channel the UE is using.

When the UE is switched on, it operates in the idle mode by selecting a suitable cell of appropriate PLMN (Public Land Mobile Network), and then tunes into its control channel, i.e. the UE "camps on a cell". The UE remains in the idle mode until it transmits a request to establish an RRC connection, which, if successful, transits the UE into the connected mode.

From the idle mode, the UE may transit into the Cell_DCH state or the Cell_FACH state of the connected mode. In the Cell_DCH state, a dedicated physical channel (DCH) is allocated to the UE. The UE uses the DCH in its user data and control information transmission. In the Cell_FACH state the UE uses either the forward access channel (FACH) or the random access channel (RACH) for transmitting both signalling messages and small amounts of user plane data. From the Cell_FACH state the UE may further transit into the Cell_PCH state or the URA_PCH state to minimise the battery consumption, whereby the UE can only be reached via the paging channel (PCH). In the Cell_PCH state, the UE is identified on a cell level in the serving RNC, but in URA_PCH state only on UTRAN Registration Area (URA) level. The UE leaves the connected mode and returns to the idle mode when the RRC connection is released or failed.

The 3GPP document TR25.922 discloses a handover between a DCH/DCH and a RACH/FACH based on a traffic measurement of a transmission channel, and a method for DCH/DCH rate change. Accordingly, when the traffic exceeds a certain threshold, there is a capability for a handover from a RACH/FACH to a DCH/DCH, or improving the DCH rate by decreasing spreading factors. On the contrary, when the traffic is less than a certain threshold, there is a capability for a handover from the DCH/DCH to the RACH/FACH, or improving the DCH rate by increasing spreading factors. The 3GPP documents TR25.922 and TS25.331 further disclose how the channel handover between a DCH/DCH and a RACH/FACH is carried out via RRC processes "Physical Channel Reconfiguration" or "Transmission channel Reconfiguration". For further details, a reference is made to said documents.

The current consumption of the UE varies significantly, depending on the mode/state the UE is using. For example, the current consumption of the DCH during transmission is substantially twice the current consumption of the FACH. Furthermore, a channel stay-up time has been defined for the DCH, whereby after transmission the DCH is specified to stay active for the stay-up time, during which the current consumption is similar to that of transmission. A typical value for the DCH stay-up time is three seconds.

In this view, the quite randomly scheduled messaging patterns of various always-on applications cause unnecessary power consumption. Each transmission of a message, despite of its size, requires its own radio channel activation causing extra power consumption. This has led to solutions, wherein small messages are gathered for a certain time period, e.g. for 10 minutes, and then grouped into a package of messages for transmission. However, since the larger messages exceeding the given threshold must be transmitted on the DCH, in such case the increase in power consumption is significant due to the higher current consumption combined with the DCH stay-up time.

According to an embodiment, savings in current consumption can be achieved by an implementation, wherein messages from different always-on applications are combined to use a uniform messaging pattern such that a number of messages are sent simultaneously, while still enabling extensive usage of the most energy efficient WCDMA channels (RRC states).

Figure 3:
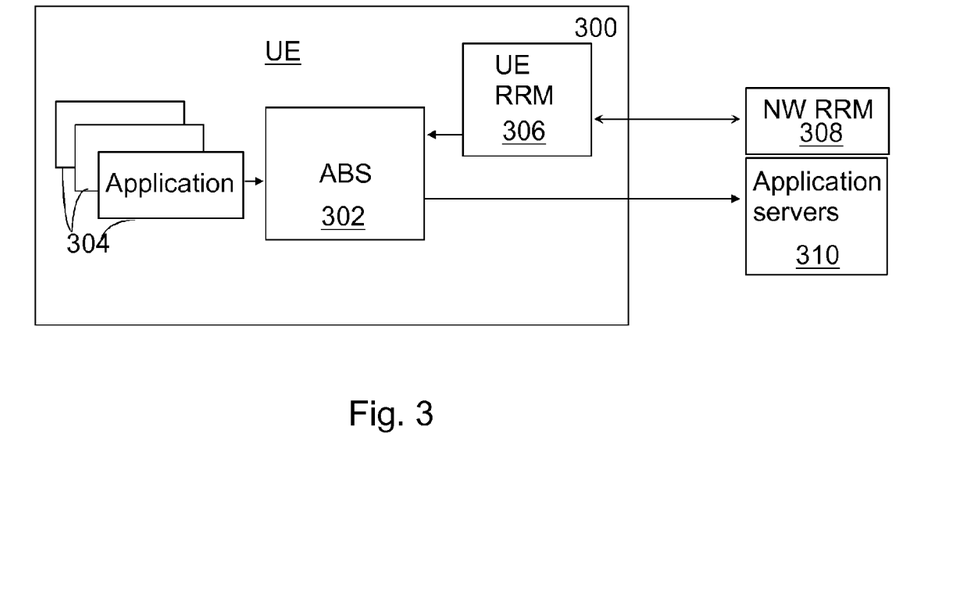
FIG. 3 shows a block chart of an optimised messaging method according to an embodiment of the invention.

The implementation is most preferably carried out as a software application stored and executable in the UE, which application is herein referred by a name "Always-on Battery Saver", i.e. ABS application. The operation of the ABS application is further disclosed by referring to a block chart of FIG. 3. In FIG. 3, the terminal 300 includes the ABS function 302, which has a task of gathering information on the used parameters of the RRC states, on one hand, and on the communication patterns used by the various always-on applications 304 currently executed in the terminal, on the other hand. The terminal 300 may include one or more always-on applications 304, which all have individual messaging patterns, which are collected to the ABS function 302. The terminal 300 further includes a radio resource management (UE RRM) block 306, which together with NW RRM block 308 of the network controls the RRC states and the parameters required to set up, modify and release the lower layer protocol entities.

Now the ABS function 302 gathers information on the communication patterns of the one or more always-on applications 304. As mentioned above, the always-on applications may include presence/Instant Messaging services, IMS services, push mail, which typically have a messaging pattern designed at least for downlink direction, but also possibly for uplink direction (e.g. for uplink Instant Messaging messages). Most of the messages relating to the always-on applications are not critical to be transmitted real-time, i.e. in most cases a transmission delay of several minutes is still acceptable. For such messages, the ABS function combines messages from various always-on applications into a group of messages, which at least in theory could be sent simultaneously together (i.e. no unreasonable delay caused).

A second factor affecting the actual communication pattern is the objective to use the most energy efficient WCDMA channels (RRC states) as extensively as possible. Now these groups of messages combined by the ABS function are examined further, if they could be transmitted in the FACH state instead of the high current consuming DCH state. For that purpose, the number of messages sent from each group of messages at a time is optimised in view of the capacity of the FACH, for example. Thus, the size of the messages is compared to the maximum size of data to be transferred on FACH, and then preferably a message package is determined, which includes one or more messages from various always-on applications such that the total size of the message package is as close to the maximum size of FACH data as possible. Naturally, if the size of even one message exceeds that the maximum size of FACH data, then the DCH must be used for transmitting the message.

According to an embodiment, the ABS function preferably examines whether the current cell of the terminal supports the Cell_PCH state. If the Cell_PCH state is supported, then it could be used instead of the idle state to minimize the current consumption of the terminal during idle times. Regardless of whether the Cell_PCH state is supported or not, the ABS function preferably further examines if the network supports state transitions from idle-to-FACH or merely from idle-to-DCH, and what are the inactivity periods and the threshold values of data amount for state transitions. Then, based on these parameters and gathered or presumed values of current consumption in different states, the ABS function then starts to determine the most energy efficient messaging pattern.

According to an embodiment, if only the state transition from idle-to-DCH is supported, then based on the average amount of message data from the various always-on applications, the ABS function calculates whether it is advantageous to optimise the total size of the message package and its transmission interval such that the terminal UE automatically stays on the Cell_FACH state (i.e. no transit to the idle state). The other option is to transit to the idle state after the transmission of the message package, whereby current savings are achieved in the idle state, but the wake-up to the connected mode is always performed via the high current consuming Cell_DCH state.

On the other hand, if the current cell of the terminal supports the Cell_PCH state or state transitions from idle-to-FACH, then according to an embodiment, the total size of the message package is preferably optimised in view of FACH transmission. Between the transmissions the terminal UE may transit to the idle state or the Cell_PCH state, and by the time of the next transmission a state transition from idle-to-FACH or from PCH-to-FACH is carried out.

Altogether, the parameters which typically affect to the determination of the most energy efficient messaging pattern include at least current consumption in different RRC states, inactivity timers of state transitions, and the adjusted data transmission capacity of each RRC state.

In WCDMA networks, there are typically determined at least three different inactivity timers for state transitions: timer T1 for the state transition from DCH-to-FACH, timer T2 for the state transition from FACH-to-PCH or FACH-to-idle, and timer T3 from PCH-to-idle. All these timers and their values are network controlled, typically managed by the RNC.

Timer T1 determines the inactivity period, which is required after traffic on the DCH channel, after which period the UE may transit to the Cell_FACH state. The T1 value is typically a couple of seconds (e.g. 2-5 s) and it may depend on the used DCH data rate such that the higher the data rate, the shorter the inactivity period. On the other hand, the T1 value should not be too short, because it would deteriorate user experience e.g. in web browsing.

Timer T2 determines the inactivity period, which is required after traffic on the FACH channel, after which period the UE may transit to the idle state or Cell_PCH state. Also the T2 value is typically a couple of seconds (e.g. 2 s), but depending on the used services it is also possible to have no timer T2 at all, i.e. the T2 value is zero. Timer T3 determines the RRC connection release period, i.e. the inactivity period of the Cell_PCH state to transit to the idle state, which is typically at least ten minutes.

The current consumption of a terminal UE in different states is always terminal-specific, and therefore only rough estimates can be given. In the contemporary mobile terminals, the current consumption in the DCH state is about 200-260 mA. In the FACH state, the current consumption is roughly half of that in the DCH state, i.e. about 100-130 mA. In the PCH state, the current consumption is very minimal, typically only a few (2-5) mA. However, it is very likely that as the technology advances, the absolute current values will become smaller, while their mutual ratio probably stays essentially the same.

Accordingly, it is obvious that the values of the timers T1 and T2 and the current consumption of the terminal in the DCH and FACH states are the parameters that have significance, when determining the most energy efficient messaging pattern. Regarding the data transmission capacity of each RRC state, the thresholds of buffered data triggering a state transition can be adjusted by the network operator. In many cases, a state transition threshold from FACH-to-DCH has been adjusted to 128 bytes of buffered data, but, for example, a threshold value of 1 kB data could be used as well.

Once the appropriate size of the message packages has been determined, a transmission interval is then calculated, i.e. how often the message packages should be sent such that no unreasonable delay or buffering of the messages is caused. Naturally, the inactivity periods triggering the state transitions are also taken into account. As mentioned above, in some occasions, it is preferable that the terminal UE stays all the time on the FACH state rather than transiting to idle state and then via DCH state back to the FACH state.

Then on the basis of the message package size and the transmission interval uniform messaging patterns are determined, preferably separately for both the uplink messaging and the downlink messaging. However, when considering especially the DCH state, both the uplink messaging and the downlink messaging should be taken into account, since the DCH channel is always established in both directions. Therefore, it there is downlink traffic on the DCH, it is also preferably to send as much data as possible to uplink direction. The ABS function 302 indicates the downlink messaging pattern to always-on application servers 310 connected to the access network. Then the application servers 310 operate together with the RRM block 308 of the network to organise the downlink messages to be transmitted such that they are received in the terminal in optimised way. Regarding the uplink messaging, the ABS function preferably itself controls the formation and transmission of the always-on messages according to the determined uplink messaging pattern. Then based on the message package size, the RRM block of the terminal allocates a suitable state for the transmission, e.g. via the above-mentioned RRC processes "Physical Channel Reconfiguration" or "Transmission channel Reconfiguration".

According to an embodiment, if there are particular reasons to use a high transmission capacity channel having low energy efficiency (e.g. DCH in case of WCDMA) for transmitting a certain message, then the ABS function is configured to transmit other buffered messages at the same time. Typically this does not cause any significant increase in current consumption, since most of the current consumption is due to the long inactivity timer. Hence, the DCH channel activation is utilised most efficiently.

Thus, if the user of the UE sends a long message (e.g. email polling) on the DCH or an always-on application requires a certain message to be transmitted at a particular time instance on the DCH, then for example the buffered status and keep-alive messages of the other always-on applications are transmitted on the DCH as well.

According to an embodiment, the ABS function may still be configured to use a timer for adjusting the transmission of the messages from the other always-on applications. Then if, for example, a status message of an always-on application has just been sent (i.e. the timer has not yet expired), no new status message is sent, even if the DCH channel is activated "for free".

Figure 4:
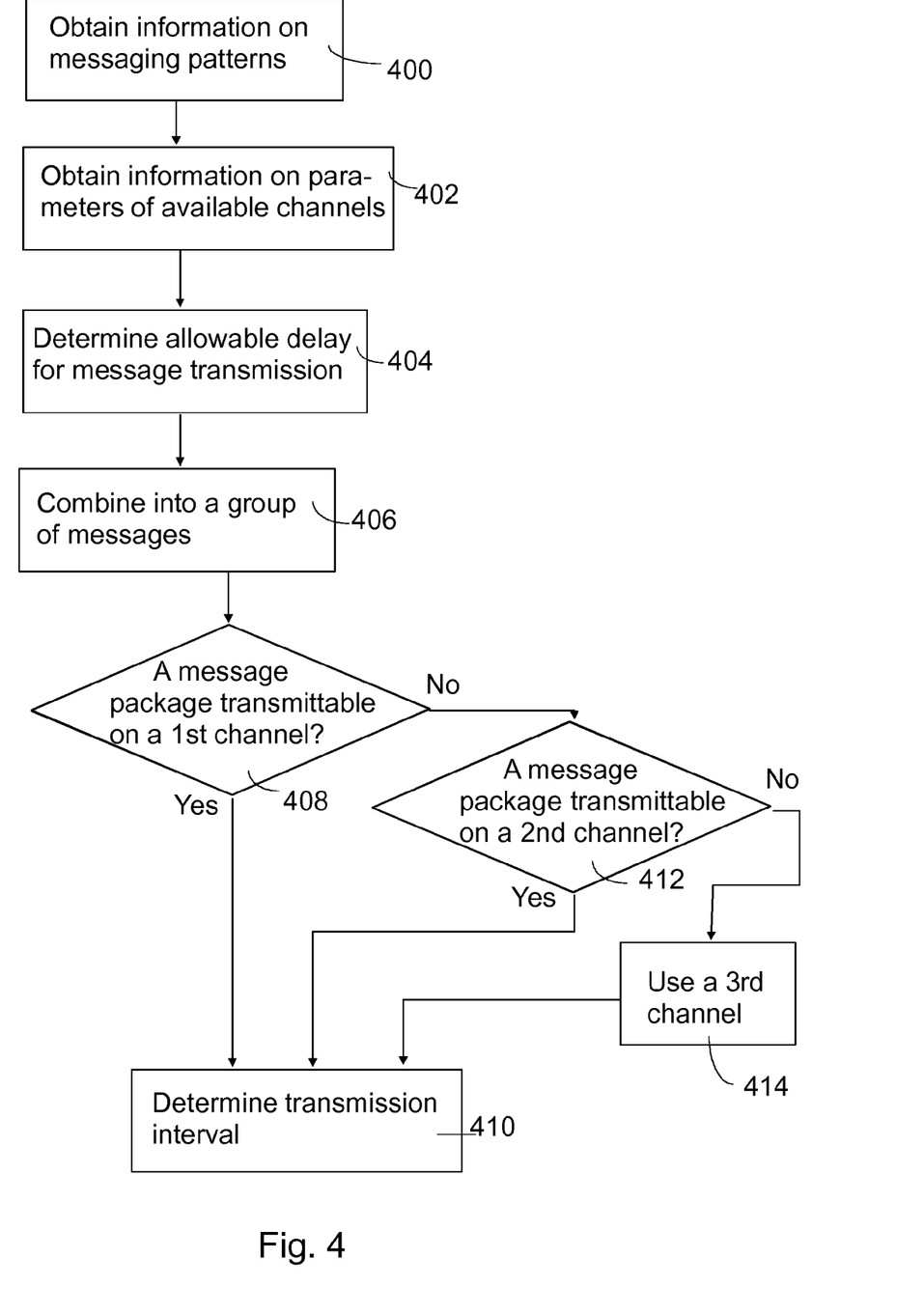
FIG. 4 shows a flow chart of an optimised messaging method according to some embodiments of the invention.
Figure 5:
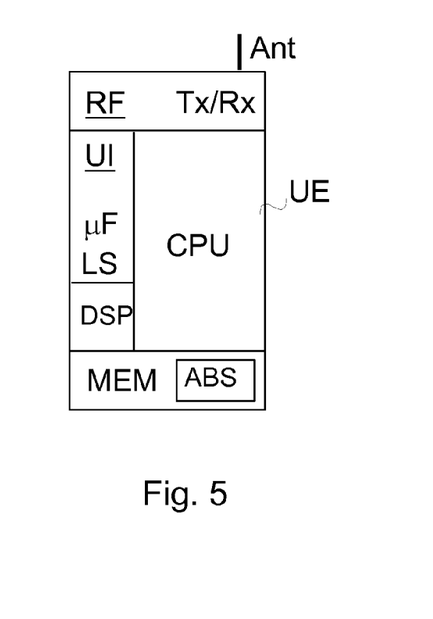
FIG. 5 shows an electronic device according to an embodiment of the invention in a reduced block chart.

Some basic principles relating to the process of determining a uniform messaging pattern for the always-on application messages is further illustrated in the flow chart of FIG. 4. In this illustration, the process is described on a general level, without limiting it particularly to WCDMA networks and its RRC states. The process of determining a uniform messaging pattern in the ABS function starts by gathering (400) information on the messaging patterns of the one or more always-on applications used in the terminal. Another step is to gather (402) information on parameters of communication channels allocated for said sending and receiving of said messages. In case of WCDMA, this practically means gathering information on the used parameters of the RRC states. The order of these steps may vary, and on the other hand, the latter step may be performed e.g. simultaneously with one or more of the steps described below.

In this illustration, the next step is to determine (404) an allowable transmission delay for said messages. As mentioned above, in most cases an acceptable transmission delay of several minutes may be allocated to most of the always-on application messages. Next, messages from the one or more always-on applications used in the terminal are calculated (406) during the allowable transmission delay, resulting in a cumulative group of messages.

Now the size of this group of messages is compared (408) to the allocated parameters of communication channels (e.g. the parameters of the RRC states), and if the transmission capacity of the most energy efficient communication channel ("$1^{st}$ channel" in FIG. 4) allows, then a message package including one or more messages transmittable within said transmission capacity is determined. Finally, for completing the uniform messaging pattern, a transmission interval is determined (410) for the message packages such that all messages within said group of messages are transmitted during said allowable transmission delay.

However, if it is noticed (in step 408 above) that no message package transmittable within the transmission capacity of the most energy efficient communication channel can be defined, then it is examined whether it is possible to define (412) a message package transmittable within the transmission capacity of the next most energy efficient communication channel ("$2^{nd}$ channel" in FIG. 4). If such message package can be defined, then a transmission interval is determined (410) for the message packages. If there is still no transmittable message package found, then the least energy efficient communication channel ("$3^{rd}$ channel" in FIG. 4) is allocated (414) for transmitting the message package with a suitable transmission interval (410).

In this example, it is assumed that there are only three communication channels with different transmission capacities available. A skilled man appreciates that if there are more than three channels available, then the steps 408-414 should be repeated until a suitable communication channel for transmitting the message package is found.

A skilled man also appreciates that in a real case of WCDMA, the actual implementation is not as straightforward as described in FIG. 4. In case of WCDMA, the state transition supported by the network and the inactivity timers for the state transitions should be carefully taken into account, and their effect to the total current consumption should be evaluated. Furthermore, in the WCDMA, there are only two channels (FACH and DCH) available for transmitting the messages, but also the third channel (PCH) should be considered for state transitions.

A skilled man further appreciates that any of the embodiments described above may be implemented as a combination with one or more of the other embodiments, unless there is explicitly or implicitly stated that certain embodiments are only alternatives to each other.

The advantages of the embodiments can be illustrated by the following hypothetical example. Let us suppose that the user of the UE has 100 presence contacts that change their status 10 times in a day, and the size of a user update message is 300 bytes. Regarding the relevant RRC parameters, the DCH minimum bitrate is 64 kbps, the inactivity timer T1 (the DCH stay-up time) is set to three seconds, and the current consumption of an active DCH channel is 220 mA. For the FACH, the maximum size of data to be transferred on FACH is adjusted to 1000 bytes (1 kB), there is no inactivity timer (T2=0), and the FACH current consumption is 120 mA.

Now considering a conventional (prior art) implementation for sending the update messages, the update messages would be first collected for the period of 10 minutes and then the whole package of the collected messages would be sent to the UE. 100 presence contacts, each sending a status update message 10 times in a day, makes 1000 update messages in a day, i.e. about 6.9 messages per 10 minutes. The size of the package (~6.9*300 B) is little more than 2 kB, which means that the package must be sent on the DCH. The duration of the transmission is 64 kbps/~2 kB=~0.25 s, plus the DCH stay-up time three seconds=3.25 s in total. Thus, the average current consumption for the 10 minutes period is 220 mA*3.25 s/(10*60 s)=1.2 mA.

According to an embodiment, a more optimised method for sending the update messages can be achieved, if the number of update messages sent at a time is optimised in view of the capacity of the FACH. Thus, since the maximum size of data to be transferred on FACH is 1000 bytes and the size of a user update message is 300 bytes, the update message package may include three messages. In order to send all the 1000 update messages in a day, such update message package including three messages must be sent 1000/(24*3)=13.9 times per hour, i.e. every 4.32 minutes. Thus, the average current consumption for the 4.32 minutes period is 120 mA*0.25 s/(4.32*60 s)=0.115 mA.

Accordingly, the average current consumption of the UE is dropped to one tenth, i.e. by about 90%, compared to the prior art implementation. A skilled person appreciates that the above example is only hypothetical and in real use-cases, the savings in current consumption may be more or less than said 90%, depending on the used always-on applications and their various parameters. However, at the same time it is evident that the embodiments disclosed herein provide significant savings in current consumption, regardless of the used always-on applications and their parameters. It should be noted that from the network viewpoint, the current savings are even more significant, since the number of messages can easily grow exponentially, when more users subscribe the presence service, which results in growing number of contacts for each user and growing number of update messages at the same time.

An example of a possible implementation of a user equipment UE is illustrated in a simplified block diagram shown in FIG. 4. The user equipment UE comprises an RF part including a transceiver Tx/Rx for arranging radio frequency communication via the antenna ANT with a Node B (base station) of the network. User interface means UI typically comprise a display, a keyboard, a microphone (μF) and a loud speaker (LS). The user equipment UE further comprises a memory MEM for storing computer program code to be executed by the central processing unit CPU comprising at least one processor. The memory MEM includes a non-volatile portion for storing the applications controlling the central processing unit CPU and other data to be stored and a volatile portion to be used for temporary data processing.

The functionalities of the invention, i.e. the ABS function, may be implemented in the user equipment UE, such as a mobile station, as a computer program which, when executed in a central processing unit CPU or in a dedicated digital signal processor DSP, affects the terminal device to implement procedures of the invention. The functions of the computer program, e.g. different sub-routines, may be distributed to several separate program components communicating with one another. The computer software may be stored into any memory means, such as the hard disk of a PC or a CD-ROM disc, from where it can be loaded into the memory of mobile terminal. The computer software can also be loaded through a network, for instance using a TCP/IP protocol stack.

It is also possible to use hardware solutions or a combination of hardware and software solutions to implement the inventive means. Accordingly, the above computer program product can be at least partly implemented as a hardware solution, for example as ASIC or FPGA circuits, in a hardware module comprising connecting means for connecting the module to an electronic device, or as one or more integrated circuits IC, the hardware module or the ICs further including various means for performing said program code tasks, said means being implemented as hardware and/or software.

It is obvious that the present invention is not limited solely to the above-presented embodiments, but it can be modified within the scope of the appended claims.

The invention claimed is:

1. A method for reducing current consumption in a communication terminal, wherein the communication terminal comprises one or more always-on applications arranged to send and receive messages relating to said one or more always-on applications to and from one or more always-on application servers connected to a communication network, the sending and receiving being carried out according to a messaging pattern specific to each always-on application; the method comprising:
   gathering, by said communication terminal, information on the messaging pattern of at least one always-on application within said communication terminal;
   gathering information on parameters of communication channels allocated for said sending and receiving of said messages;
   determining an allowable transmission delay for said messages;
   combining, in said communication terminal, messages from said one or more always-on applications during said allowable transmission delay into a group of messages;
   determining a uniform messaging pattern for said messages of said one or more always-on applications separately for an uplink direction and a downlink direction according to the following rule:
      i) determining, from said group of messages, a message package including the number of messages transmittable within the transmission capacity of the most energy efficient communication channel, and
      ii) determining a transmission interval for the message packages;
   transmitting, by said communication terminal, the messages within said group of messages on the most energy efficient communication channel during said allowable transmission delay; or if the size of a smallest possible message package exceeds the transmission capacity of the most energy efficient communication channel, arranging, by said communication terminal, said message package to be transmitted on a next most energy efficient communication channel having a transmission capacity for transmitting said message package;
   transmitting said uniform messaging pattern for the downlink direction to said one or more always-on application servers; and
   arranging the downlink messaging by means of said one or more always-on application servers and a channel resource function of the communication network.

2. The method according to claim 1, further comprising controlling the uplink messaging according to said uniform messaging pattern by means of a channel resource function of the communication terminal.

3. The method according to claim 1, wherein the communication network includes a WCDMA access network, wherein the communication channels allocated for transmitting said messages between said communication terminal and the communication network are determined by RRC states, which are controlled by the radio resource management (RRM) blocks of said communication terminal and said communication network.

4. The method according to claim 3, further comprising arranging the state transitions between the RRC states according to energy efficiency, inactivity period and transmission capacity of DCH, FACH and PCH states of the WCDMA access network.

5. The method according to claim 4, wherein in response to the current cell of the communication terminal supporting the PCH state or state transitions from idle-to-FACH, optimising the total size of the message package in view of FACH transmission.

6. The method according to claim 4, wherein in response to detecting another cause to use the DCH state for transmitting a certain message, transmitting any buffered message of the always-on application at the same time on the DCH.

7. The method according to claim 1, wherein in response to a transmission of a message requiring an activation of a least energy efficient communication channel, transmitting buffered messages from at least one always-on applications on the same communication channel.

8. The method according to claim 1, wherein said one or more always-on applications include at least one of the following: presence/IM application, IMS services, push mail, push-to-talk application.

9. A communication terminal, comprising:
one or more always-on applications arranged to send and receive messages relating to said one or more always-on applications to and from one or more always-on application servers connected to a communication network, the sending and receiving being carried out according to a messaging pattern specific to each always-on application;
a battery saving function for gathering information on the messaging pattern of at least one always-on application; said battery saving function being arranged to
gather information on parameters of communication channels allocated for said sending and receiving of said messages;
determine an allowable transmission delay for said messages;
combine messages from said one or more always-on applications during said allowable transmission delay into a group of messages;
determine a uniform messaging pattern for said messages of said one or more always-on applications separately for an uplink direction and a downlink direction according to the following rule:
  i) determining, from said group of messages, a message package including the number of messages transmittable within the transmission capacity of the most energy efficient communication channel, and
  ii) determining a transmission interval for the message packages;
transmit the messages within said group of messages on the most energy efficient communication channel during said allowable transmission delay; or if the size of a smallest possible message package exceeds the transmission capacity of the most energy efficient communication channel, arranging said message package to be transmitted on a next most energy efficient communication channel having a transmission capacity for transmitting said message package; and
transmit said uniform messaging pattern for the downlink direction to said one or more always-on application servers for arranging the downlink messaging.

10. The communication terminal according to claim 9, wherein the communication terminal is arranged to control the uplink messaging according to said uniform messaging pattern by means of a channel resource function of the communication terminal.

11. The communication terminal according to claim 10, wherein the communication terminal is arranged to access the communication network via a WCDMA access network, wherein the communication channels allocated for transmitting said messages between said communication terminal and the communication network are determined by RRC states, which are controlled by the radio resource management (RRM) blocks of said communication terminal and said communication network.

12. The communication terminal according to claim 11, wherein the communication terminal is arranged to configure the state transitions between the RRC states according to energy efficiency, inactivity period and transmission capacity of DCH, FACH and PCH states of the WCDMA access network.

13. The communication terminal according to claim 12, wherein in response to the current cell of the terminal supporting the PCH state or state transitions from idle-to-FACH, the terminal is arranged to optimize the total size of the message package in view of FACH transmission.

14. The communication terminal according to claim 12, wherein in response to the communication terminal detecting another cause to use the DCH state for transmitting a certain message, the communication terminal is arranged to transmit any buffered message of the always-on applications at the same time on the DCH.

15. The communication terminal according to claim 9, wherein the communication terminal is arranged to in response to detecting a transmission of a message requiring an activation of a least energy efficient communication channel, transmit buffered messages from at least one always-on application on the same communication channel.

16. The terminal according to claim 9, wherein said one or more always-on applications include at least one of the following: presence/IM application, IMS services, push mail, push-to-talk application.

17. A non-transitory computer readable medium comprising a computer program product, executable in a communication terminal, stored thereon, for reducing current consumption, when executed in the terminal comprising one or more always-on applications arranged to send and receive messages relating to said one or more always-on applications to and from one or more always-on application servers connected to a communication network, the sending and receiving being carried out according to a messaging pattern specific to each always-on application, the computer program product comprising:
a computer program code section for gathering, by the communication terminal, information on the messaging pattern of at least one always-on application within said communication terminal;

a computer program code section for gathering information on parameters of communication channels allocated for said sending and receiving of said messages;

a computer program code section for determining an allowable transmission delay for said messages;

a computer program code section for combining, in said communication terminal, messages from said one or more always-on applications during said allowable transmission delay into a group of messages; and a computer program code section for determining a uniform messaging pattern for said messages of said one or more always-on applications separately for uplink direction and downlink direction according to the following rule:

i) determining, from said group of messages, a message package including the number of messages transmittable within the transmission capacity of the most energy efficient communication channel, and ii) determining a transmission interval for the message packages; and transmitting, by said communication terminal, the messages within said group of messages on the most energy efficient communication channel during said allowable transmission delay; or if the size of a smallest possible message package exceeds the transmission capacity of the most energy efficient communication channel, arranging, by said communication terminal, said message package to be transmitted on a next most energy efficient communication channel having a transmission capacity for transmitting said message package; and a computer program code section for transmitting said uniform messaging pattern for downlink direction to said one or more always-on application servers for arranging the downlink messaging.

* * * * *